US007167173B2

(12) United States Patent
Balmelli et al.

(10) Patent No.: US 7,167,173 B2
(45) Date of Patent: Jan. 23, 2007

(54) METHOD AND STRUCTURE FOR IMAGE-BASED OBJECT EDITING

(75) Inventors: Laurent Balmelli, White Plains, NY (US); Fausto Bernardini, New York, NY (US); José Gomes, Douglaston, NY (US); Holly Rushmeier, Mount Kisco, NY (US); Gabriel Taubin, Providence, RI (US)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 10/665,231

(22) Filed: Sep. 17, 2003

(65) Prior Publication Data

US 2005/0062739 A1    Mar. 24, 2005

(51) Int. Cl.
*G06T 15/00* (2006.01)
(52) U.S. Cl. .................. 345/419; 348/906; 707/10
(58) Field of Classification Search ................ 345/419, 345/421–422, 426; 707/10, 101; 709/217–218; 348/460, 906; 703/1, 2
See application file for complete search history.

(56) References Cited

U.S. PATENT DOCUMENTS

| | | | | |
|---|---|---|---|---|
| 5,307,456 A | * | 4/1994 | MacKay | ..................... 715/782 |
| 5,416,890 A | * | 5/1995 | Beretta | ........................ 345/590 |
| 6,417,850 B1 | * | 7/2002 | Kang | ........................ 345/422 |
| 6,850,946 B1 | * | 2/2005 | Rappaport et al. | .......... 707/101 |
| 2004/0135780 A1 | * | 7/2004 | Nims | ......................... 345/419 |

* cited by examiner

*Primary Examiner*—Phu K. Nguyen
(74) *Attorney, Agent, or Firm*—Scully, Scott, Murphy & Presser, P.C.; Rafael Perez-Pineiro, Esq.

(57) ABSTRACT

Disclosed are an image editing user interface system and method. The system includes one or more computers with one or more graphical user interfaces, and a receiving process for receiving one or more rendered two dimensional images on the computer graphical user interface. Each two dimensional image represents reflected light from a lit three dimensional object model, and the reflective light at each point of the two dimensional image corresponds to an object point on the three dimensional object model. The system further includes a changing process for changing a portion of the two dimensional image by changing the light intensity at a set of one or more points on the two dimensional image. The change in light intensity at the set of points causes a change in the three dimensional model to correspond to the change in the light intensity.

20 Claims, 12 Drawing Sheets

METHOD AND STRUCTURE FOR IMAGE-BASED OBJECT EDITING

BACKGROUND OF THE INVENTION

1. Field of the Invention

This invention relates to the field of computer image processing and computer aided design. More specifically, the invention relates to editing three dimensional models by editing two dimensional images

2. Background Art

The size and complexity of three dimensional (3D) digital models is increasing in many applications. Advanced computer aided-design systems running on powerful workstations enable the creation of complex, large models. Furthermore, scanning devices can capture models of up to billions of vertices with accompanying surface properties. The editing of such complex 3D objects is a challenging user interface problem Fine detailed editing of objects is needed for the design of products requiring aesthetic appeal that are to be produced by programmed machines—i.e., products that have to look good and are going to be produced by automated manufacturing processes based on numerical descriptions of products. Examples of such products include containers for home products like laundry detergent, home appliances like vacuum cleaners or air freshener plug-ins, children's toys, and home furnishings.

Many products are designed by geographically distributed teams. There thus is a need for designers to interact with large data sets that are stored at some distant location, and so there is a need for a "lightweight" object editing interface.

Complex models are increasing used in feature film and computer games. Technicians in these areas need fine control over object editing to create character expressions and to provide realistic props and backgrounds.

Engineers and technicians are no longer the only population that want to edit complex models. Detailed 3D scans of patients may be used by medical doctors planning plastic surgery. Detailed scans can also used by museums and archaeological excavations. Object editing may be required by historians or archaeologists to study and evaluate conjectures about digitized artifacts.

One reason that 3D object editing is difficult is that it is now common for models to be comprised of hundreds of megabytes or more. While numerous simplification methods have been developed, many objects overwhelm rendering systems when displayed with full visual quality. A second reason the problem is difficult is that a user is trying to modify an object in 3D with either a two dimensional (2D) or an imprecise 3D interface device. Large scale, general changes in shape are readily indicated, but fine scale editing over a large region is difficult. In 2D, a 2D gesture by the user needs to be interpreted by the interface as a 3D operation—such as pushing, pulling or cutting an object. In 3D, the response the user has using common haptic devices is still limited compared with true physical modeling modalities such as modeling clay and stone sculpture.

Prior art systems for 2D image painting and editing have evolved over several decades. While a variety of commercial systems are available, they share a common set of user tools. Commercial products have extended these 2D paint tools to painting multiple layers of appearance attributes (color, bumps, shininess etc.) on 3D objects. These 3D paint programs offer the option of a "projection paint" mode that allows the user to export 2D images of an object from an arbitrary view to a 2D image editing program to edit the object texture layers with a full array of 2D imaging tools. The projection paint system then projects the user's texture edits back onto the maps associated with the 3D model.

Recognizing the success of 2D paint programs, researchers in 3D geometric editing have adapted successful tools such as cut-and-paste and other image operations to 3D editing toolkits. However, these systems use the 2D toolkits as inspiration, rather than giving users the ability to edit geometry from within an existing 2D editing system. Some systems allow users to use 2D systems to create 2.5D surfaces by interpreting painted intensity values as heights. These systems are indirect however, because gray-scale coded heights do not correspond to a shaded rendering of an object.

With the interest in recent years in image-based modeling and rendering, many efforts have explored how geometry and images can be beneficially combined. Various researchers have considered how limited geometric information can be used to enhance image editing systems. In Oh, Chen, Dorsey and Durand, "*Image-based modeling and photo editing,*" Proceedings of SIGGRAPH 2001, pp. 433–442, a system was presented that allows a user to add depth information that is then used in an enhanced photo-editing system. In Seitz and Kutulakos, "*Plenotic Image Editing,*" Proc. of the $6^{th}$ International Conference on Computer Vision, 1998, pp. 17–24, the authors describe a method that uses a crude intermediate geometric representation to facilitate the simultaneous editing of multiple views of the same object.

Recently there has also been substantial interest in refining methods from computer vision for geometric object creation, such as the method described in Debevec, Taylor, and Malik, "*Modeling and Rendering architecture from photographs: a hybrid geometry-and image-based approach,*" Proceedings of SIGGRAPH 1996, pp. 11–20. While methods from computer vision have been successful for creating 3D objects, most methods do not lend themselves to editing 3D objects. It is natural to ask the user to edit a single image of the shape as they want to see it.

The method from computer vision which extracts an object from a natural image is referred to as shape from shading. A wide variety of shape from shading algorithms exist but have not gained popularity in capture systems because they are not robust in the presence of effects such as spatially varying albedo, uncertainty in light source direction and surfaces with discontinuities. In Van Overveld, "*Painting gradients: Free-form surface design using shading patterns,*" in Graphics Interface 96, 1996, pp. 151–158, Van Overveld makes compelling arguments for an image-based geometric editing system, but rejects the use of shape from shading as too time consuming. Instead, Van Overveld proposes a specialized system in which a user paints gradients directly and is required to define an integrable surface at each step in the editing process. This constrains intermediate edits, and disallows the use of general 2D paint programs.

SUMMARY OF THE INVENTION

An object of this invention is an improved system and method for editing three dimensional computer object models.

Another object of this invention is an improved system and method for editing three dimensional objects using two dimensional images.

These and other objectives are attained with an image editing user interface system and method. The system includes one or more computers with one or more graphical user interfaces, and a receiving process for receiving one or more rendered two dimensional images on the computer graphical user interface. Each two dimensional image represents reflected light from a lit three dimensional object model, and the reflective light at each point of the two dimensional image corresponds to an object point on the three dimensional object model. The system further includes a changing process for changing a portion of the two dimensional image by changing the light intensity at a set of one or more points on the two dimensional image. The change in light intensity at the set of points causes a change in the three dimensional model to correspond to the change in the light intensity.

BRIEF DESCRIPTION OF THE DRAWINGS

The foregoing and other objects, aspects, and advantages will be better understood from the following non-limiting detailed description of preferred embodiments of the invention, given with reference to the drawings that include the following.

DETAILED DESCRIPTION OF THE PREFERRED EMBODIMENTS

This invention relates to editing complex 3D objects. In accordance with the invention, the problem of editing a 3D object of arbitrary size and surface properties is converted to a problem of editing a 2D image. The invention allows the user to specify edits in both geometry and surface properties from any view and at any resolution they find convenient, regardless of the interactive rendering capability of their computer. The preferred embodiment of the invention uses specially-constrained shape from shading algorithms to convert a shaded image specified by the user by painting, cut-and-paste, or any other 2D image editing tool into a 3D geometry.

In the particular description given herein, complex objects are represented by triangle meshes of arbitrary size associated with an atlas of images, which define surface details and appearance properties. The term surface maps is used to refer to these images that encode the detail and appearance properties. Detail and appearance properties can include many different aspects of an object, but in this description, detailed surface normals and diffuse reflectance are used as examples of surface maps that are represented as images that are mapped to the geometry.

The editing technique described herein can also be applied to other numerical descriptions used for representing 3D digital objects. Furthermore, the editing technique can be applied to 3D digital objects comprised of geometry only, without any associated surface maps. The geometric representation of the object is not exposed to the user. The user specifies edits by positioning a simplified model and generating a detailed image at arbitrary resolution. The user edits the detailed image to specify object edits, and the edited image is then used to update the 3D model.

Figure 1:
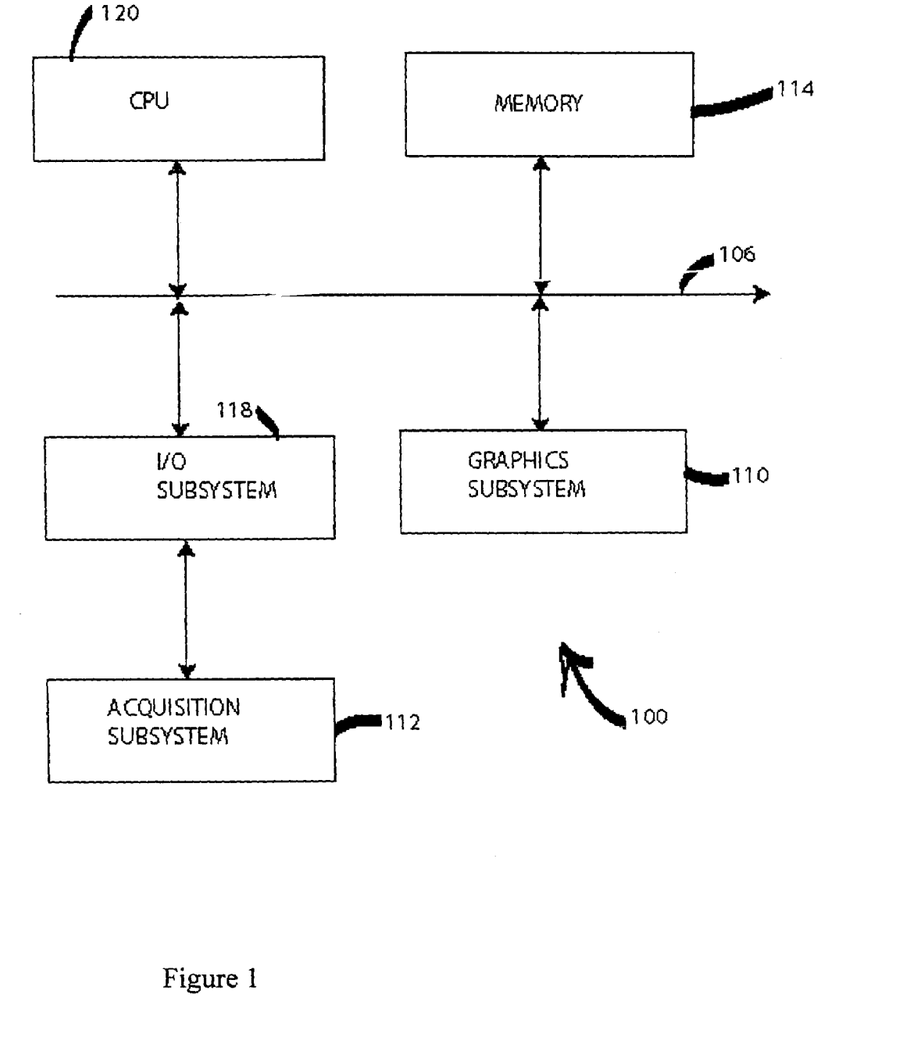
FIG. 1 is a block diagram of a computer system with graphics and 3D data acquisition capabilities that is suitable for practicing this invention.

FIG. 1 is a block diagram of a computer system 100 with a graphics subsystem 110 and a 3D data acquisition system 112 that is suitable for capturing the 3D models described herein. A system bus 106 interconnects a CPU 120 with the graphics subsystem 110 and a system memory 114. The acquisition system is preferably but not necessarily interfaced through an I/O subsystem 118. As an alternative to the use of the acquisition system, a user may create a complex model by interacting directly with an I/O subsystem.

Figure 2:
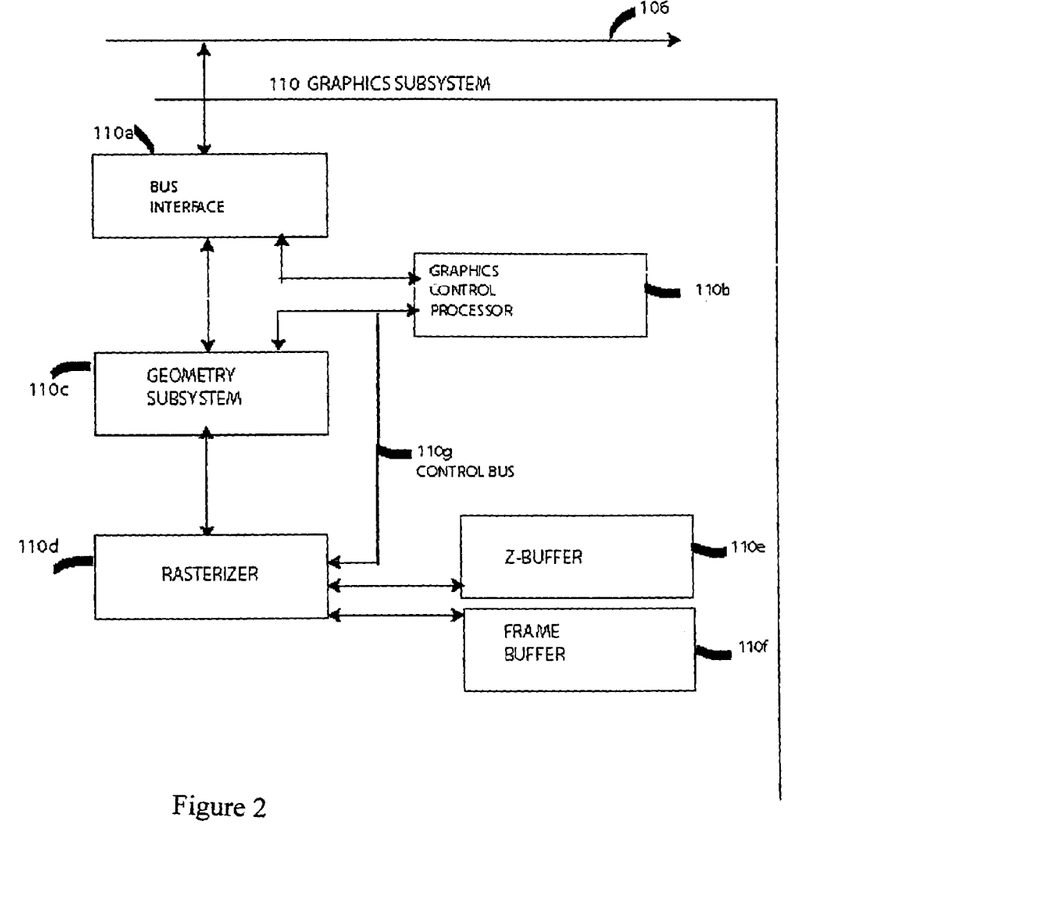
FIG. 2 shows the graphics subsystem of FIG. 1 in greater detail.

FIG. 2 shows the graphics subsystem 110 in greater detail. A bus interface 110a connects the system bus 106 to a graphics control processor 110b and to a geometry subsystem 110c. A graphics control processor 110b control bus 110g also connects to the geometry subsystem 110c and to a rasterizer 110d. A depth or z-buffer 110e and a frame buffer 110f are also typically coupled to the rasterizer 110d, and cooperate to render the object models for display.

The computer system 100 illustrated in FIGS. 1 and 2 is used to create the original 3D digital model. In the example described herein, a very limited version of the computer system 100 can be used to edit the 3D object. To edit the object, no acquisition system 112 is needed, and the graphics subsystem 110 may be comprised of only a frame buffer 110f, with the other graphical display operations performed in a computer program that is loaded into the computer memory 114.

Figure 3:
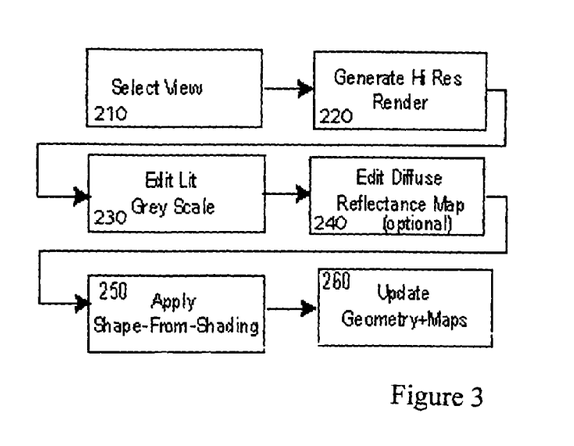
FIG. 3 shows an editing workflow in accordance with a preferred embodiment of this invention.
Figure 4:
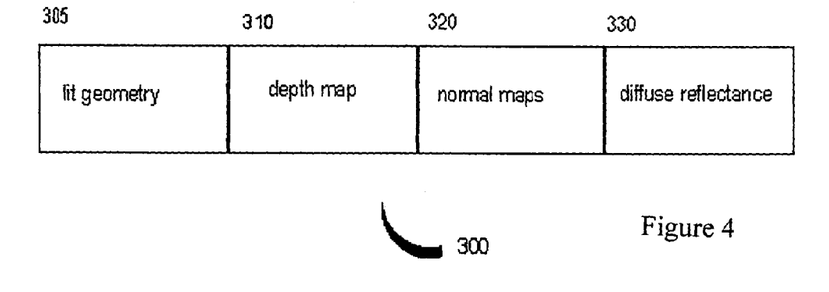
FIG. 4 illustrates a block diagram of one preferred data structure containing data used by the present system.

FIG. 3 shows the process of defining and processing an object edit in the preferred system of this invention. In step 210, the user selects a view of a 3D object to be edited, using an interactive display of a very simplified version of the object (by simplified meaning a version that requires much less data to describe). A simplified model is used because the objects we consider may be too large to render interactively with all of the associated surface texture maps. In step 220, a program generates a high resolution rendering—that is, images with a large number of pixels showing the full detail of the object for the selected view. The structure of the data 300 that is rendered is shown in FIG. 4 and is comprised of a lit geometry image 305, a depth map 310 and, optionally, normals maps 320 and a diffuse reflectance map 330.

In step 230 of FIG. 3, the lit geometry image—that is an image of the object as if it were coated with a grey diffuse (i.e. matte) paint and illuminated—is edited by the user to indicate what an image of the edited shape should look like. In optional step 240, the diffuse reflectance map 330 is edited to specify how the diffuse reflectance of the edited object (i.e., the intrinsic colors of the edited object) should look. In step 250, a shape-from-shading method is applied to update the depth map 310 to a depth map corresponding to the edited object. Finally, in step 260, the original object geometry is updated to be consistent with the updated depth map and, optionally, the diffuse reflectance map.

The specific examples discussed below are from editing sessions applied to a museum virtual restoration application. It should be emphasized, however, that the process of this invention can be used in a wide range of applications, including engineering, technical and medical applications.

Figure 10:
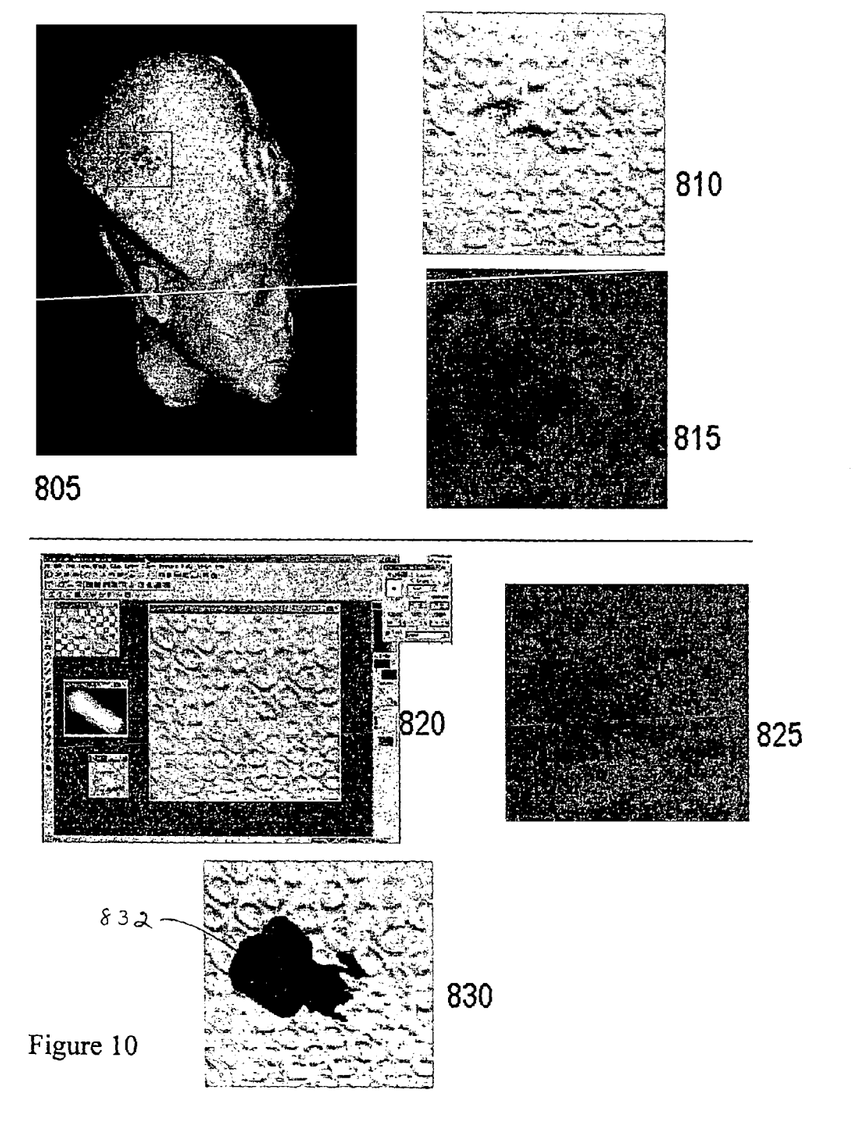
FIG. 10 illustrates a sequence of images showing editing of a 3D object using the present invention.

FIG. 10 shows the images presented to the user in an interface for the process illustrated in FIG. 3. In this example, the invention is used to fill a chip in the head of the sculpture, and to cover the filled area with the ringed pattern that appears in the surrounding region. A particular viewpoint is selected using a simplified model in image 805. The lit geometry 810 and diffuse reflectance map 815 are generated by the high resolution rendering process. In 820, the 2D editing interface using a common 2D commercial editing package is shown, with the user employing a cut and paste operation to generate an image of what the object should look like after the edit is applied.

The same interface is used to create the edited diffuse reflectance map 825. It is possible that the luminance of some pixels will not change, even though a change in the geometry at that pixel is intended. The image 830 shows the result of using image dilation and painting to fill in the full area that has been edited. The area to be updated by the automated processes is indicated in a darker shade 832 in image 830, and this "hints" image will be provided to the shape from shading solver to define the extent in which changes are to be made.

Figure 5:
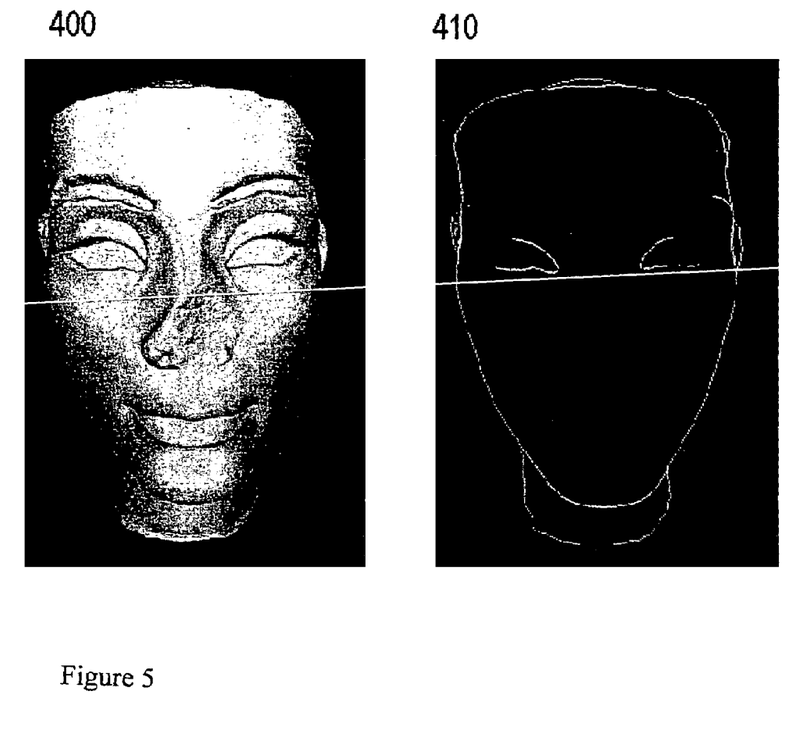
FIG. 5 shows a lit grey diffuse image of an object and a bit map with edge information about the image.
Figure 6:
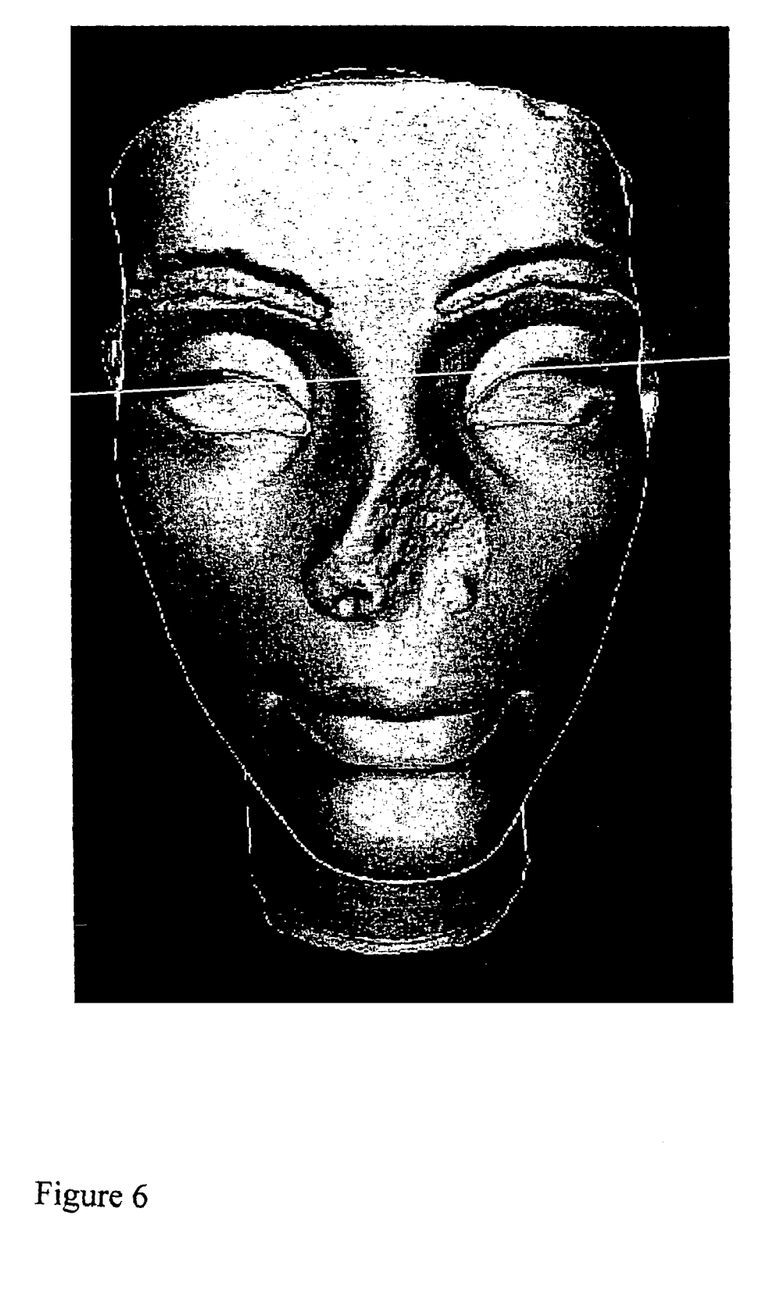
FIG. 6 shows the edge information superimposed on the lit image to indicate to the user areas that cannot be edited in this view.

To ensure that the edited object will remain a manifold, preferably edited areas in the image are bounded by fixed depth map values and do not include depth discontinuities. Depth discontinuities are illustrated in FIGS. 5 and 6. The lit grey image of an object is shown in image 400. The depth discontinuities are shown in image 410. FIG. 6 shows a composite of the lit image and the depth discontinuities that can be presented to the user to indicate where edits are not allowed in this particular view.

Figure 12:
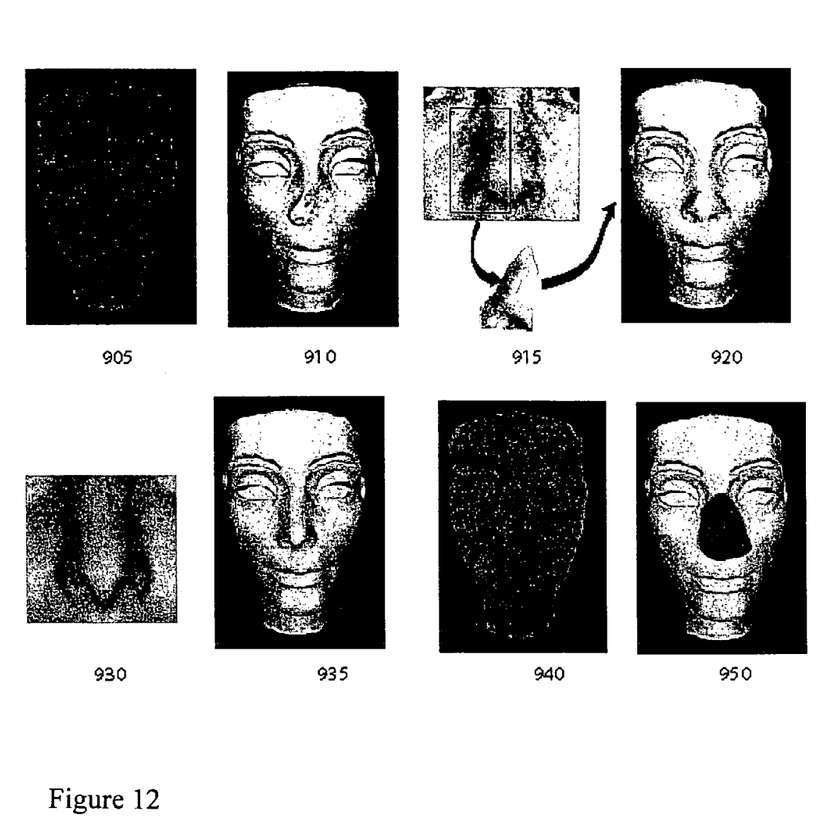
FIG. 12 illustrates an alternate editing of a 3D object.

An editing scenario with consideration of depth discontinuities is shown in FIG. 12. The diffuse reflectance map is shown in 905, and the lit gray image is shown in at 910. Areas that can not be edited for a view are marked for the user in 910. In the preferred embodiment, areas that can not be edited are marked in blue for the user. Within these constraints, any image operation is acceptable—blurring, sharpening, image cut-and-paste, painting, etc.

FIG. 12 shows the replacement of the nose of the figure with two types of input. In 915 the process starts with an image of a real nose, takes one side of it, and altars and smoothes the shading. Then, the nose from 915 is used to update the grey image in 910 to produce image 920. It may be noted that the albedo and lighting of the source image for the nose are unknown. In 930, an alternative nose is taken from the rendering of another geometric model, and this nose is applied to 910 to generate an alternative edit, shown in 935. the shading level is changed and the aspect ratio of the image is slightly altered to fit it into the missing nose area. The edited diffuse reflectance map is shown in 940, and the hints image showing the area to be updated is shown in 950.

Figure 7:
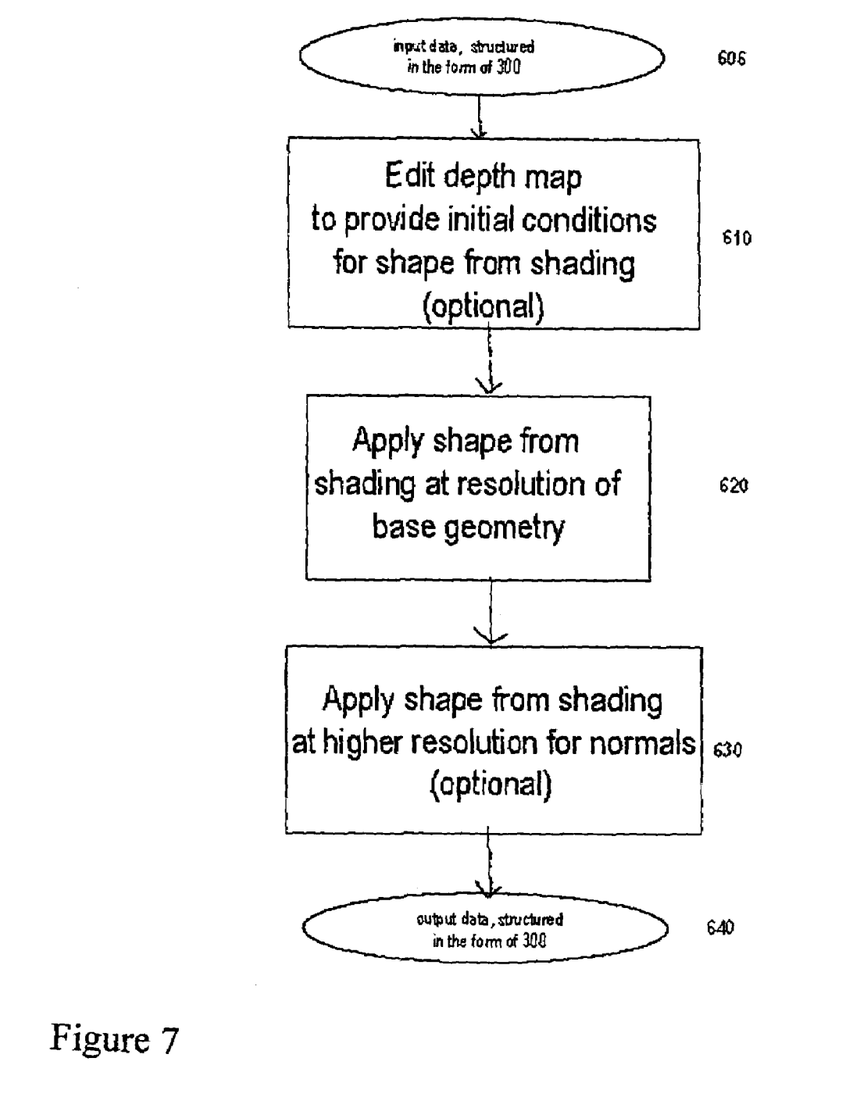
FIG. 7 shows the work flow for the application of a shape from shading process.

FIG. 7 gives the detail of applying the shape from shading algorithm to the lit gray image. The input 606 is data of the structure illustrated in 300 in FIG. 4. Optionally in step 610, an initial guess for the updated depth map may be given by the user by editing a pseudo-colored image of the depths. The shape from shading algorithm 620 is then applied to compute the updated depth map representing the new geometry. Optionally, the shape from shading can be used to compute even higher resolution normals in step 630. The result is an updated data set 640 in the same structure as illustrated in FIG. 4.

As will be understood by those skilled in the art, the diffuse reflectance map edits can be applied directly to update the original object. However, the grayscale edits are preferably converted into an updated depth map before the edits are applied. To determine the new depths for the edited region, the classic shape from shading problem is solved. Shading is the variation of brightness across the photograph resulting from the local variation of the orientation of the surface with respect to the light sources and the camera. This question has been explored extensively, as described in a recent survey, Zhang, Tsai, Cryer and Shah, "*Shape from Shading a survey,*" IEEE Trans. On Pattern Analysis and Machine Intelligence, vol. 21, no. 8, pp. 690–706, 1999.

Let us identify the aspects of the theory of shape from shading relevant to image-based geometric editing. The factors accounting for shading include the lighting conditions, the object shape, its material reflectance properties, and the camera properties. Isolating the shape information is too difficult in general and preferably the problem is simplified a great deal. The approach that has been most successful was to assume that the light source is bounded and at an infinite distance (i.e. a directional light), that the object has a smooth shape and is Lambertian, that there is no occlusion boundary, that the solution is known on the boundary of the resolution domain, and finally, that the camera performs an orthographic projection.

By design, all these conditions but the last are ideally met in our example. We are not dealing with a natural photograph but with an artificial image generated under such conditions. In the editing application of this invention, a perspective camera may be used for more realism, but the spatial extent of the edits is relatively small and we approximate locally the camera by an orthographic model. The usual approximate model of shape from shading for real photographs becomes a better model for image-based geometric editing because the only approximation is on the camera model.

It may be helpful to review this model. Consider an open two dimensional set $\Omega$ of image pixels corresponding to an entirely visible and lit part S of the depicted object surface. The brightness of the rendered image is then given by $I(\rho)=N(x)\cdot L$, where the point x on S projects onto the pixel $\rho$ in $\Omega$, $n(x)$ is a unit normal to S at x, L is a unit vector representing the light direction and * denotes the scalar product of two vectors. It may be noted that there are two distinct definitions of n in the preferred framework. Indeed, S is represented as the union of a number of triangulated patches and the associated normal maps. The normal maps may arise from "photometric stereo," i.e. from the set of real photographs initially acquired. These "photometric normals" are denote by $n^p$. But $n^p$ can be computed from the triangulation as well. We denote by $n^g$ the "geometric normals." The motivation for this distinction is that $n^p$ is sampled at a higher resolution, typically we have 10 pixels per triangle.

Ideally, the brightness equation should be satisfied by both normals, i.e., $I(\rho)=L\cdot n^g(x)$ and $I(\rho)=L\cdot n^p(\rho)$. The first equation allows to recover the underlying geometry, while the second yields a more precise description of the normals, accounting in particular for details that are smaller than the resolution of the triangulation. The reason why we do not solve only the second equation for both purposes is that photometric normals do not necessarily need to integrate as a valid surface and so they cannot necessarily yield the underlying geometry. Their role is only to describe the smallest possible details. That said, the two normals should at least agree to a certain extent and the two solutions must be somewhat coupled, as discussed below. It is convenient to solve both equations in the image grid and it also makes it more natural to deal with multiple resolutions. This is made possible by using the depth map z to compute the geometric normals. The photometric normals are readily available on the image grid.

We now explain how the brightness equations are solved. It is well known that the shape from shading problem can be ill-posed, depending on the data. In the case of image-based geometric editing, we can expect to be in situations where no solution exists or multiple solutions exist because a hand-defined shading might be incompatible with any realizable surface or, on the contrary, be degenerate. This motivates the use of a variational method to look for the "best" surface, in a sense to be made more precise. In addition, variational methods result in iterative algorithms and they make it easy to take advantage of an initial guess, suggested by the user. This is an important, preferred feature of the invention as, in practice, it solves the ill-posedness of the shape from shading.

Variational methods are well known in the art, and accordingly, it is not necessary to discuss these methods in detail herein. However, for the sake of review, these methods will be briefly described. Consider a 2D vector field u defined on $\Omega$. presumably equal to $\nabla z$, and look for a smooth integrable solution by minimizing $$\int_\Omega \alpha(I-L\cdot n^g(u))^2 + \beta(\nabla^\perp \cdot u)^2 + \gamma(Du)^2,$$

where $$n^g(u) = (\|u\|^2 + 1)^{-\frac{1}{2}}(-u, 1), \quad \nabla^\perp = \left(\frac{\partial}{\partial y}, -\frac{\partial}{\partial x}\right),$$

Du is the Jacobian of u and $\alpha$, $\beta$ and $\gamma$ are scalar weights. The first term accounts for the fidelity to the shading and the Euclidean norm is used for the sake of simplicity. The second term accounts for the integrability of u and it is important to deal with inconsistent shadings. The last term is a regularization penalty, which accounts for the smoothness of the solutions. Similarly, the photometric normals $n^p$ are computed by minimizing the integral $$\int_\Omega \mu(I-L\cdot n^p)^2 + \nu(D_n p)^2 + \psi(n^p - n^g)^2,$$

under the constraint $\|n^p\|=1$, where $\mu$, $\nu$ and $\psi$ are scalar weights. The first term accounts for the fidelity to the shading, the second term for smoothness and the last term couples $n^p$ to $n^g$. Another interpretation of the last term is that it penalizes non-integrable photometric normals since ng is the normal vector to an (almost) integrable surface. However, one might want to keep this contribution relatively small to allow sharp variations of the photometric normals at the expense of integrability.

As previously, a stable minimizing numerical scheme may be derived from the corresponding Euler-Lagrange equations. The latter are straightforward for the first and last terms.

As far as the scalar weights are concerned, they are defined up to a scaling factor for each equation. We have chosen experimentally a set of parameters and all the examples given herein use the following: $\alpha=1$, $\beta=1$, $\delta=0.1$, $\mu=1$, $\nu=1$ and $\psi=0.01$.

Figure 8:
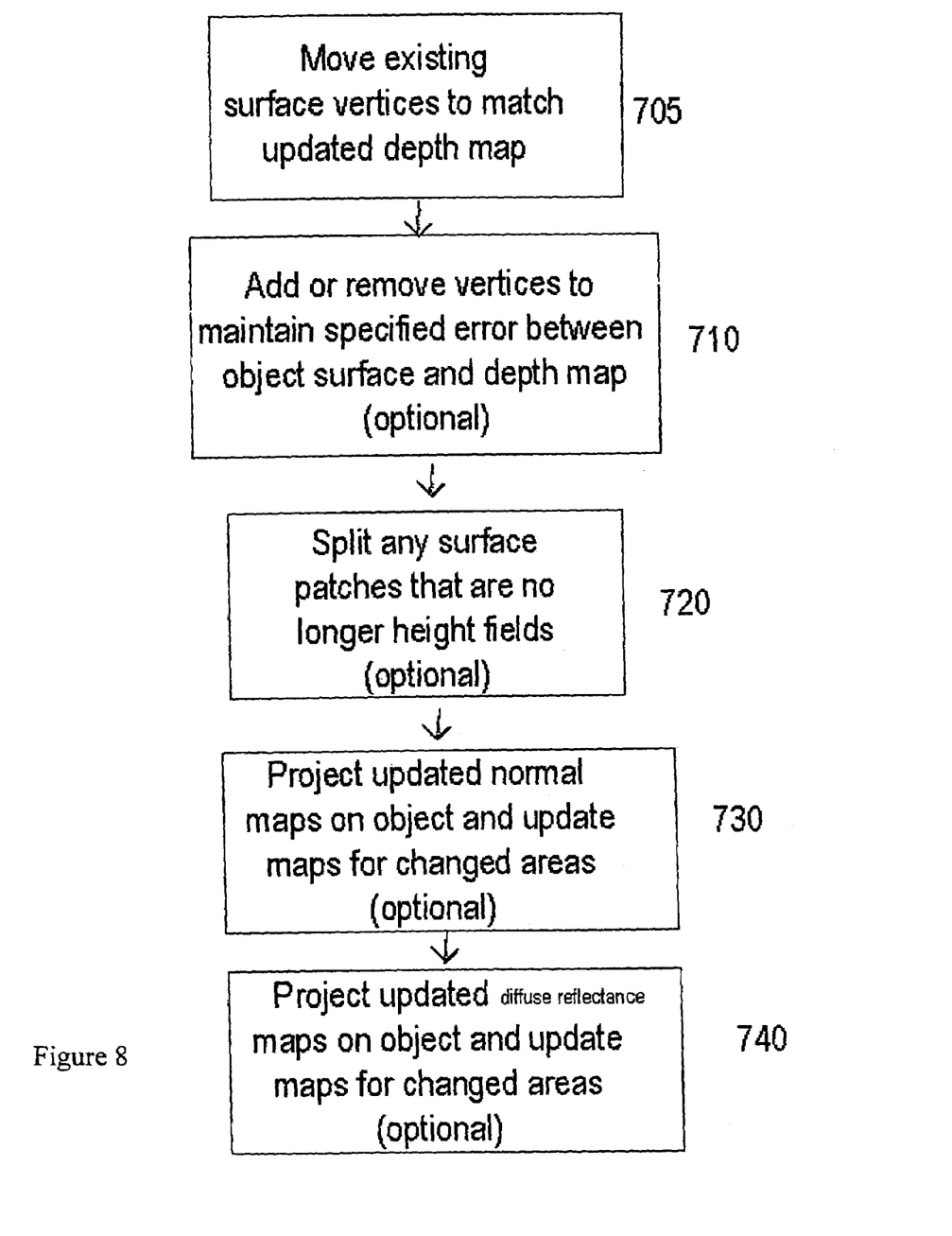
FIG. 8 shows a flow chart of the update geometry and maps process.

After shape from shading has been applied to transform the edited image into a new shape, the new geometry depth map, normal map and diffuse reflectance maps are used to update the original model. The update proceeds in two steps—up-dating the underlying charts and then applying the normal and diffuse reflectance maps. The process of then updating the underlying mesh is illustrated in FIG. 8. In step 705, each existing vertex in a changed area is moved along the line-of-sight of the edited image's virtual camera so that it lies on the new depth map computed from shape from shading. The movement of vertices in step 705 is further illustrated in diagram 707 in FIG. 9. The original mesh may have a resolution that is either too dense or too sparse to represent the change in geometry. In step 710, after changing the position of existing vertices, the surface optionally could be refined or decimated to maintain the same level of consistency with the true geometric surface as was represented in the original model.

Figure 9:
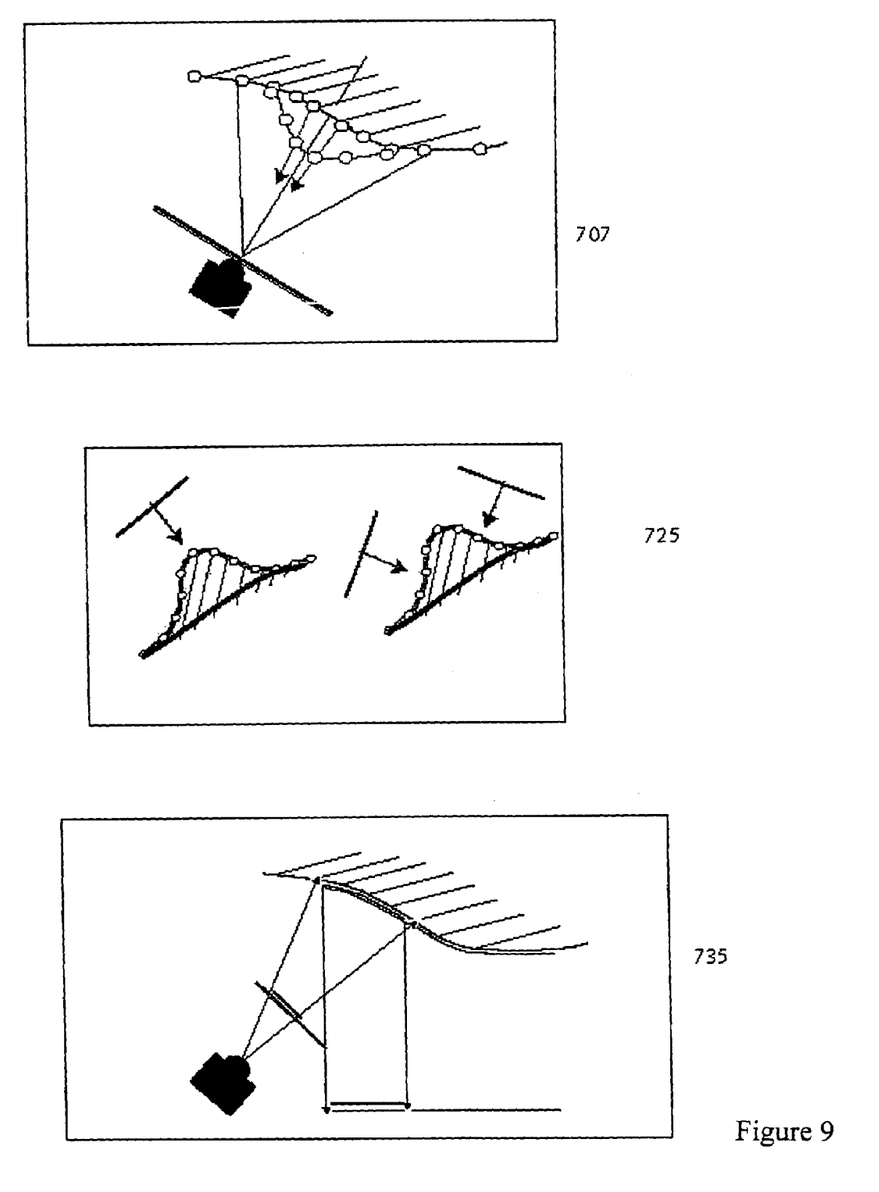
FIG. 9 shows details of steps shown in FIG. 8.

Edits that result in a valid surface can require a repartitioning of the surface mapping to avoid undesirable or unacceptable stretching of the surface maps. In optional step 720, surfaces may be split if they are no longer height fields. In diagram 725 of FIG. 9, the splitting of a surface is shown. In optional steps 730 and 740, the normal maps and diffuse reflectance maps can be respectively updated by projecting the edited images on the model and identifying the surface maps to be altered. Diagram 735 in FIG. 9 illustrates the projection required.

Figure 11:
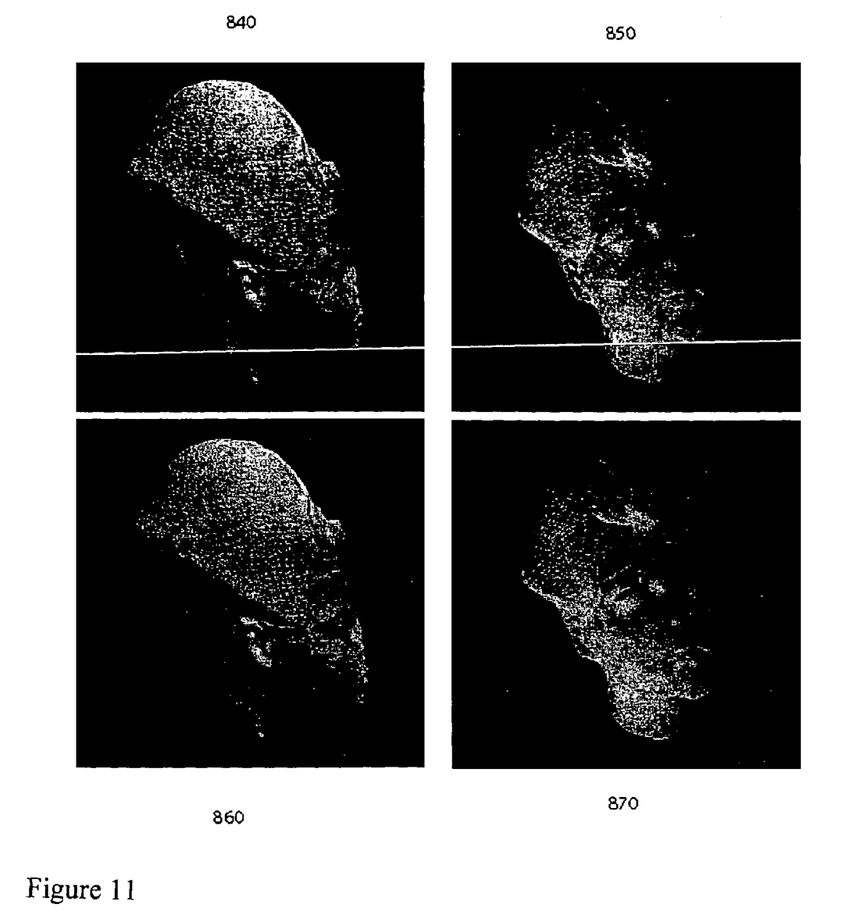
FIG. 11 shows the results of the edits of FIG. 10.
Figure 13:
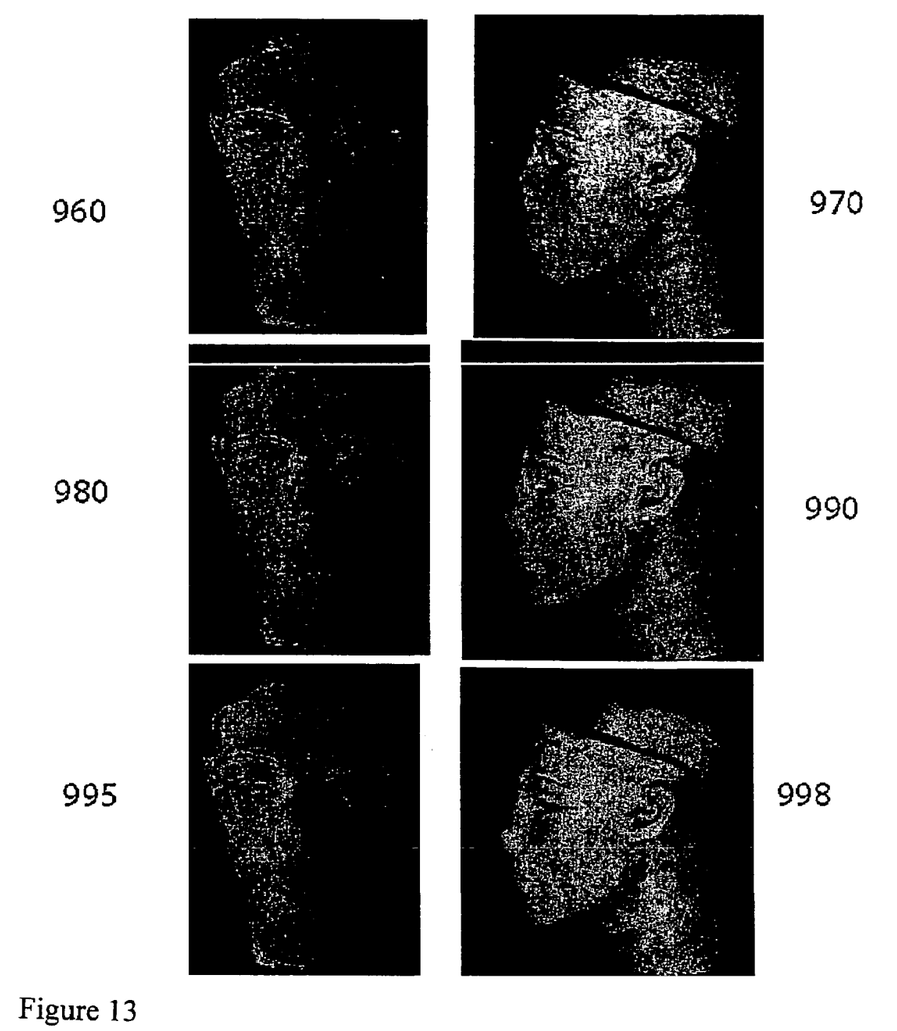
FIG. 13 shows the results of the edits of FIG. 12.

An embodiment of the invention has been actually implemented in C++ using Open GL software libraries to perform the rendering to obtain the initial images for editing, and to do the projections required to update the geometry and image maps. The editing illustrated in FIGS. 10 and 12 was performed on a computer with a Pentium III 1.2 Ghz processor, 512 Mb of memory and no graphics hardware acceleration. FIGS. 11 and 13 show the results respectively for the edits made in FIGS. 10 and 12. For the object shown in FIG. 10, the full object is composed of 314, 246 triangles organized into 92 charts (i.e., small triangle meshes), and maps containing 2.9 million non-zero pixels that specify the diffuse reflectance and normal at a higher spatial resolution (i.e., approximately 9 pixels per triangle).

The view to be edited in 805 was rendered as a 512 by 512 pixel image, and 15.7% of the pixels (i.e., 41,174) were shown as darter in the edited region in 830. The shape from shading solution computing steps 620 and 630 took 4 minutes and 45 seconds on the Pentium III processor. FIG. 11 shows the model before editing in 840 and 850, and after editing in 860 and 870. FIG. 13 shows the results of the edits specified by the images shown in FIG. 12. Images 960 and 970 show the model before editing. 980 and 990 show the object after applying the edit specified in 920, 995 and 998 show the model after applying the edit shown in 935.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. An image editing user interface system comprising:
   one or more computers with one or more graphical user interfaces;
   a receiving process for receiving one or more rendered two dimensional images on the computer graphical user interface, each two dimensional image representing reflected light from a lit three dimensional object model having a given shape, the reflective light at each point of the two dimensional image corresponding to an object point on the three dimensional object model; and a changing process for changing a portion of the two dimensional image by changing the light intensity at a set of one or more points on the two dimensional image, the change in light intensity at the set of points causing a change in the shape of the three dimensional model to correspond to the change in the light intensity.

2. A system according to claim 1, where the change in the three dimensional model is a change in the surface curvature at each object point corresponding to one of the points in the set of points of the two dimensional model.

3. A system according to claim 2, wherein a color is changed at one or more of the object points with a changed surface curvature.

4. A system according to claim 2, wherein surface curvature is represented in the three dimensional object model.

5. A system according to claim 2, wherein surface curvature is represented by additional three dimensional information.

6. A system according to claim 5, wherein the additional three dimensional information is a bit map representing one or more of the following: normals at the object point, and displacement of the object point.

7. A system according to claim 1, wherein one or more of the changed points on the two dimensional image are rendered with depth information corresponding to the position of their respective object point.

8. A system according to claim 7, wherein the depth information is edited to resolve ambiguity in the changed object points.

9. A system according to claim 1, wherein the two dimensional image further comprises geometric discontinuities that can not be changed by a user in the two dimensional image rendered.

10. An image editing user interface system comprising:
one or more computers with one or more graphical user interfaces;
a receiving process for receiving one or more rendered two dimensional images on the computer graphical user interface, each two dimensional image representing reflected light from a lit three dimensional object model, the reflective light at each point of the two dimensional image corresponding to an object point on the three dimensional object model; and
a changing process for changing a portion of the two dimensional image by changing the light intensity at a set of one or more points on the two dimensional image, the change in light intensity at the set of points causing a change in the three dimensional model to correspond to the change in the light intensity; and
wherein the reflected light at each point of the two dimensional image corresponds to the respective object point because a light source lighting the three dimensional model and a point diffuse reflectance of the three dimensional model are invariant.

11. An image editing user interface method comprising the steps of:
receiving one or more rendered two dimensional images on a computer graphical user interface, each two dimensional image representing reflected light from a lit three dimensional object model having a given shape, the reflective light at each point of the two dimensional image corresponding to an object point on the three dimensional object model; and changing a portion of the two dimensional image by changing the light intensity at a set of one or more points on the two dimensional image, the change in light intensity at the set of points causing a change in the share of the three dimensional model to correspond to the change in light intensity.

12. A method according to claim 11, wherein a light source lighting the three dimensional model and a point diffuse reflectance of the three dimensional model are invariant so that the reflected light at each point of the two dimensional image corresponds to the respective object point.

13. A method according to claim 11, wherein the change in the three dimensional model is a change in the surface curvature at each object point corresponding to one of the points in the set of points of the two dimensional model.

14. A method according to claim 13, wherein surface curvature is represented in the three dimensional object model.

15. A method according to claim 13, wherein surface curvature is represented by additional three dimensional information.

16. A method according to claim 15, wherein the additional three dimensional information is a bit map representing one or more of the following: normals at the object point, and displacement of the object point.

17. A program storage device readable by machine, tangibly embodying a program of instructions executable by the machine to perform method steps for editing an image, said method steps comprising:
receiving one or more rendered two dimensional images en a computer graphical user interface, each two dimensional image representing reflected light from a lit three dimensional object model having a given shape, the reflective light at each point of the two dimensional image corresponding to an object point on the three dimensional object model; and
changing a portion of the two dimensional image by changing the light intensity at a set of one or more points on the two dimensional image, the change in light intensity at the set of points causing a change in the shape of the three dimensional model to correspond to the change in light intensity.

18. A program storage device according to claim 17, wherein the change in the three dimensional model is a change in the surface curvature at each object point corresponding to one of the points in the set of points of the two dimensional model.

19. A program storage device according to claim 17, wherein surface curvature is represented in the three dimensional object model.

20. A program storage device according to claim 17, wherein the reflected light at each point of the two dimensional image corresponds to the respective object point because a light source lighting the three dimensional model and a point diffuse reflectance of the three dimensional model are invariant.

* * * * *